US009904681B2

(12) United States Patent
Nitz et al.

(10) Patent No.: US 9,904,681 B2
(45) Date of Patent: Feb. 27, 2018

(54) METHOD AND APPARATUS FOR ASSEMBLING A SET OF DOCUMENTS RELATED TO A TRIGGERING ITEM

(75) Inventors: Kenneth Nitz, Redwood City, CA (US); David Dunkley, Cambria, CA (US); Thierry Donneau-Golencer, Menlo Park, CA (US); Adam Cheyer, Oakland, CA (US); Leslie Pound, Sunnyvale, CA (US); Stephen L. Hardt, Woodinville, WA (US)

(73) Assignee: SRI INTERNATIONAL, Menlo Park, CA (US)

( * ) Notice: Subject to any disclaimer, the term of this patent is extended or adjusted under 35 U.S.C. 154(b) by 68 days.

(21) Appl. No.: 13/182,245

(22) Filed: Jul. 13, 2011

(65) Prior Publication Data

US 2012/0131020 A1 May 24, 2012
US 2016/0188578 A9 Jun. 30, 2016

Related U.S. Application Data

(63) Continuation-in-part of application No. 12/632,491, filed on Dec. 7, 2009.

(60) Provisional application No. 61/415,722, filed on Nov. 19, 2010, provisional application No. 61/144,117,
(Continued)

(51) Int. Cl.
*G06F 17/30* (2006.01)
*G06F 17/27* (2006.01)
*G06Q 10/10* (2012.01)
*G06K 9/00* (2006.01)
(Continued)

(52) U.S. Cl.
CPC .... *G06F 17/30011* (2013.01); *G06F 17/2785* (2013.01); *G06F 17/30696* (2013.01); *G06F 17/30705* (2013.01); *G06F 17/30864* (2013.01); *G06K 9/00483* (2013.01); *G06K 9/6202* (2013.01); *G06Q 10/10* (2013.01); *G06F 17/30699* (2013.01); *G06F 17/30867* (2013.01); *H04L 67/22* (2013.01)

(58) Field of Classification Search
CPC .... G06Q 10/10; G06Q 10/00; G06F 11/3495; G06F 17/30867; G06F 11/3438; G06F 17/30038; G06F 11/3072; G06F 11/3079; G06F 17/30507
USPC ....... 707/749, 702, 687, 705, 706, 709, 741, 707/748, 755, 769, 782, 802, 804, 100, 707/104
See application file for complete search history.

(56) References Cited

U.S. PATENT DOCUMENTS

5,920,316 A 7/1999 Oran et al.
6,298,344 B1 10/2001 Inaba et al.
(Continued)

*Primary Examiner* — Dangelino Gortayo
(74) *Attorney, Agent, or Firm* — Hickman Palermo Becker Bingham LLP (57) ABSTRACT

The present invention relates to a method and apparatus for assembling a set of documents related to a triggering item. One embodiment of a method for assembling a set of electronic documents related to an electronic triggering item detected by a computing device being operated by a user includes automatically extracting by the computing device a set of features from the triggering item, without receiving a request by the user to assemble the set of electronic documents, and assembling as the set of electronic documents a plurality of documents that is relevant to the set of features, wherein the plurality of documents is retrieved from a plurality of different types of electronic sources.

30 Claims, 4 Drawing Sheets

Related U.S. Application Data filed on Jan. 12, 2009, provisional application No. 61/219,259, filed on Jun. 22, 2009.

(51) Int. Cl.
*G06K 9/62* (2006.01)
*H04L 29/08* (2006.01)

(56) References Cited

U.S. PATENT DOCUMENTS

| | | | |
|---|---|---|---|
| 6,480,830 B1 * | 11/2002 | Ford | G06Q 10/109 705/7.19 |
| 6,640,230 B1 * | 10/2003 | Alexander | G06Q 10/107 707/999.01 |
| 7,076,546 B1 | 7/2006 | Bates et al. | |
| 7,457,872 B2 * | 11/2008 | Aton et al. | 709/224 |
| 7,496,567 B1 | 2/2009 | Steichen | |
| 7,587,411 B2 | 9/2009 | De Vorchik et al. | |
| 7,689,933 B1 | 3/2010 | Parsons | |
| 7,747,621 B2 | 6/2010 | Sato et al. | |
| 7,797,331 B2 * | 9/2010 | Theimer | G06F 17/30038 707/769 |
| 7,831,601 B2 * | 11/2010 | Oral | G06F 17/30696 707/722 |
| 7,912,820 B2 * | 3/2011 | Garden et al. | 707/702 |
| 7,933,906 B2 * | 4/2011 | Hammond et al. | 707/750 |
| 7,941,419 B2 * | 5/2011 | Bhatkar | G06F 21/31 707/708 |
| 7,970,637 B2 * | 6/2011 | Macbeth | G06F 8/00 705/7.11 |
| 7,970,753 B2 * | 6/2011 | Oral | G06F 17/30011 707/711 |
| 7,970,791 B2 * | 6/2011 | Liao | G06F 21/6227 707/791 |
| 7,991,764 B2 * | 8/2011 | Rathod | 707/713 |
| 8,005,865 B2 * | 8/2011 | Passey et al. | 707/793 |
| 8,056,007 B2 * | 11/2011 | Rupp et al. | 715/255 |
| 8,069,186 B2 * | 11/2011 | Farnham et al. | 707/802 |
| 8,099,407 B2 * | 1/2012 | Auerbach et al. | 707/709 |
| 8,122,028 B2 * | 2/2012 | Newbold | G06F 17/30864 707/741 |
| 8,266,148 B2 * | 9/2012 | Guha | G06F 17/30867 707/737 |
| 8,341,534 B2 * | 12/2012 | Bier et al. | 715/752 |
| 8,364,514 B2 * | 1/2013 | Macbeth et al. | 705/7.25 |
| 8,407,078 B1 * | 3/2013 | Caputo et al. | 705/7.27 |
| 8,442,940 B1 * | 5/2013 | Faletti et al. | 707/610 |
| 8,468,244 B2 * | 6/2013 | Redlich et al. | 709/225 |
| 2003/0115189 A1 * | 6/2003 | Srinivasa | G06F 17/30699 707/999.003 |
| 2007/0300174 A1 | 12/2007 | Macbeth et al. | |
| 2008/0104535 A1 | 5/2008 | DeLine et al. | |
| 2008/0126983 A1 | 5/2008 | Keohane et al. | |
| 2008/0301190 A1 * | 12/2008 | Lockhart | G06Q 10/109 707/999.107 |
| 2009/0100347 A1 * | 4/2009 | Schemers | G06Q 10/109 715/751 |
| 2009/0192965 A1 * | 7/2009 | Kass et al. | 706/46 |
| 2009/0199133 A1 | 8/2009 | Deutsch et al. | |
| 2010/0070877 A1 * | 3/2010 | Scott | G06Q 10/109 715/751 |
| 2010/0094839 A1 * | 4/2010 | Brach | G06Q 10/107 707/705 |
| 2010/0162172 A1 | 6/2010 | Aroner | |
| 2010/0180200 A1 | 7/2010 | Donneau-Golencer et al. | |
| 2011/0276396 A1 * | 11/2011 | Rathod | 705/14.49 |

\* cited by examiner

METHOD AND APPARATUS FOR ASSEMBLING A SET OF DOCUMENTS RELATED TO A TRIGGERING ITEM

CROSS REFERENCE TO RELATED APPLICATIONS

This application claims the priority of U.S. Provisional Patent Application Ser. No. 61/415,722, filed Nov. 19, 2010, which is herein incorporated by reference in its entirety.

REFERENCE TO GOVERNMENT FUNDING

This application was made with Government support under contract no. FA8750-07-D-0185 awarded by the Air Force Research Laboratory and under contract no. NBCHD030010 awarded by the Department of Interior/National Business Center, under contract no. NBCHD030010. The Government has certain rights in this invention.

FIELD OF THE INVENTION

The present invention relates generally to data management, and relates more particularly to technology for assisting in data management.

BACKGROUND OF THE DISCLOSURE

Events such as business trips, employment interviews, proposal activities, technical paper reviews, and the like often require that an individual review a set of documents related to the event. For example, interviewing a job candidate may require review of the candidate's resume, transcripts, writing samples, and other documents.

These relevant documents are typically collected by performing a desktop search that requires several iterations. Such searches rely heavily on what the searcher knows and what he finds during the search. For example, the searcher may need to know where on his desk top the relevant documents reside (e.g., in a desk top folder, in an email message, on a networked server, etc.). Thus, such searches are time consuming and do not guarantee that the searcher will locate all relevant documents even after many iterations of searching.

SUMMARY OF THE INVENTION

The present invention relates to a method and apparatus for assembling a set of documents related to a triggering item. One embodiment of a method for assembling a set of electronic documents related to an electronic triggering item detected by a computing device being operated by a user includes automatically extracting by the computing device a set of features from the triggering item, without receiving a request by the user to assemble the set of electronic documents, and assembling as the set of electronic documents a plurality of documents that is relevant to the set of features, wherein the plurality of documents is retrieved from a plurality of different types of electronic sources.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for assembling a set of documents related to a triggering item. The triggering item may be, for example, an event or a document that is relevant to the user. In particular, embodiments of the invention harvest documents from a plurality of sources and then estimate the relevancy of the harvested documents to the triggering item. Once the relevancies are estimated, the harvested documents are ranked and/or filtered based on relevancy to produce the set of documents. The set of documents is then delivered to the user, who may provide feedback that helps guide the assembly of future document sets. Within the context of the present invention, a "document" refers to any sort of information that can be harvested from a computing device or network. Thus, a set of documents might include things like emails, white papers, and contracts as well as flight information, news articles, and weather data.

Figure 1:
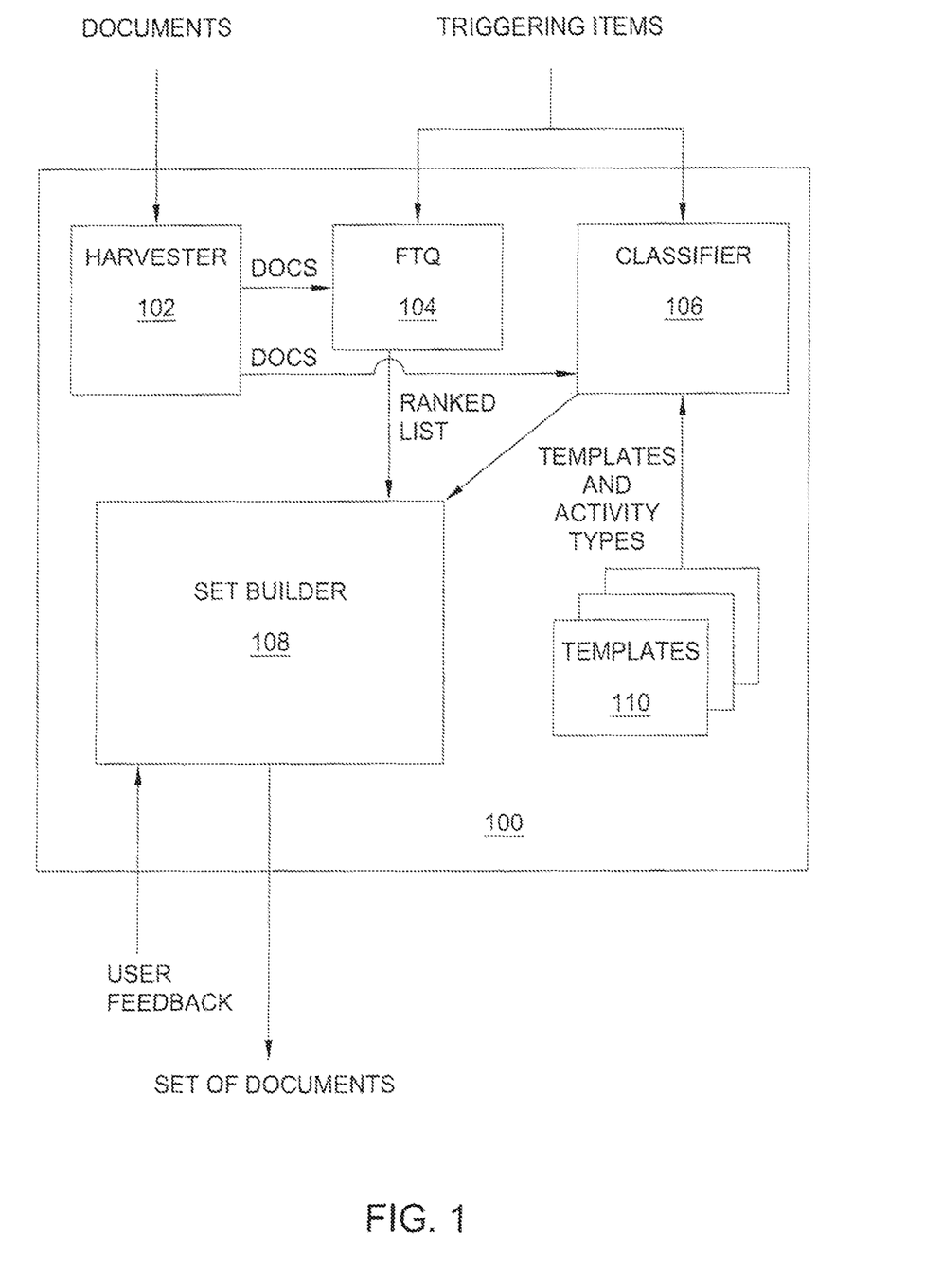
FIG. 1 is a schematic diagram illustrating one embodiment of a system for assembling a set of documents related to a triggering item, according to the present invention.

FIG. 1 is a schematic diagram illustrating one embodiment of a system 100 for assembling a set of documents related to a triggering item, according to the present invention. The system 100 is implemented within a computing device that is operated by a user. The computing device may comprise, for example, a desk top computer, a lap top computer, a tablet computer, a server, a smart phone, a gaming device, a set top box, a digital media receiver, or the like. The computing device may or may not be connected to a network.

In general, the inputs to the system 100 comprise a set of documents and a triggering item. In turn, the system outputs a subset of the documents that is relevant to the triggering item. As illustrated, the system 100 comprises five main components: a harvester 102, a full text query (FTQ) processor 104, a classifier 106, a set builder 108, and a plurality of templates 110.

The harvester 102 indexes and processes documents including files (e.g., word processing files, spreadsheet files, presentation files, individual slides in presentation files, audio files, video files, etc.), calendar events, to do lists, notes, emails, and email attachments. These documents may be retrieved locally from the user's computer and/or remotely from network storage (e.g., a server that stores documents produced by a plurality of users). In the latter case, the harvester 102 may also retrieve documents from the World Wide Web (e.g., web pages). The harvester 102 is coupled to the FTQ processor 104 and the classifier 106, such that the harvester 102 may provide harvested documents to the FTQ processor 104 and the classifier 106.

The FTQ processor 104, as discussed above, is coupled to the harvester 102. In addition to the harvested documents, the FTQ processor also receives triggering items from the computing device. As discussed above, a triggering item may comprise an event (e.g., a calendar item, a business trip, an employment interview, a proposal activity, a technical paper review, etc.) or a document (e.g., an email message, a word processing document, a spreadsheet, a slideshow presentation, a text file, a web page, a chat message, etc.). The triggering item may be entered automatically by an application running on the computing device (e.g., a scheduling application).

The FTQ processor 104 estimates the relevancy of the triggering item to the harvested documents. In one embodiment, the FTQ processor extracts features from the triggering item (such as keywords, people, dates, locations, acronyms, or the like) and then builds a query around these features. In one embodiment, the features are assigned weights in the query. The query is then run against a search (e.g., a LUCENE full text query) over the harvested documents. This produces a list of ranked documents based upon the features (words) and document frequency. The FTQ processor 104 is coupled to the set builder 108 and provides this ranked list to the set builder 108.

The classifier 106 also receives the triggering item. The classifier 106 uses information about the triggering item to select a template from the templates 110. Specifically, the classifier 106 extracts an activity type from the triggering item, and then selects the template that most closely matches the activity type. As discussed in further detail below, the activity type guides the identification of relevant documents. That is, for certain events and documents (e.g., business trips), the same types of documents must typically be gathered (e.g., flight details, hotel and car reservations, weather forecast, itinerary, etc.). The template identifies these types of documents.

As discussed above, the classifier also receives the harvested documents. The classifier 106 extracts an activity type from each harvested document, much in the same way that the classifier 106 extracts the activity type from the triggering item. In one embodiment, the classifier 106 is a maximum entropy classifier. The classifier 106 is coupled to the set builder 108 and provides the selected template and the document activity types to the set builder.

The set builder 108 is coupled to the FTQ processor 104 and to the classifier 106 and receives the list of ranked documents and the selected template from the FTQ processor 104 and the classifier 106, respectively. The set builder 108 uses the selected template and the activity types to re-rank and filter the list of ranked documents. In particular, the set builder 108 re-ranks the documents based on those whose activity type most closely matches the activity type of the selected template. The set builder 108 outputs a final set of documents relevant to the triggering item. In one embodiment, the set builder 108 receives user feedback regarding the final set of documents. The user feedback may be used to refine the assembly of future sets of documents, as discussed in further detail below.

Those skilled in the art will appreciate that FIG. 1 illustrates only one possible configuration of the system 100. In alternative configurations, for example, two or more of the individual system components could be replaced by a single component. Conversely, any single one of the system components could be replaced by multiple components.

Figure 2:
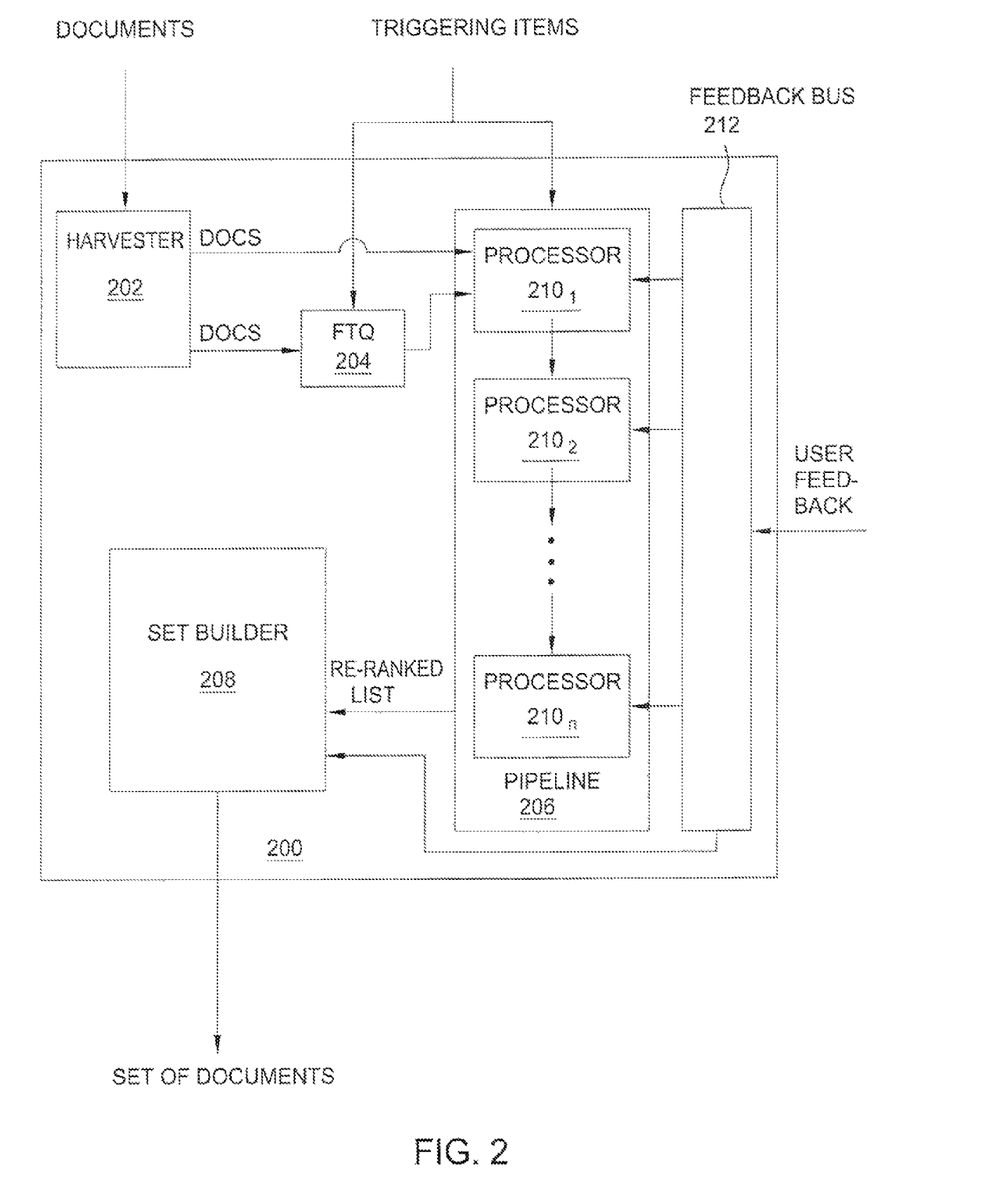
FIG. 2 is a schematic diagram illustrating a second embodiment of a system for assembling a set of documents related to a triggering item, according to the present invention.

FIG. 2 is a schematic diagram illustrating a second embodiment of a system 200 for assembling a set of documents related to a triggering item, according to the present invention. Like the system 100, the system 200 is implemented within a computing device that is operated by a user and that may or may not be connected to a network.

As above, the inputs to the system 200 comprise a set of documents and a triggering item. In turn, the system outputs a subset of the documents that is relevant to the triggering item. As illustrated, the system 200 comprises four main components: a harvester 202, a full text query (FTQ) processor 204, a pipeline 206 comprising a plurality of processors $210_1$-$210_n$ (hereinafter collectively referred to as "processors 210"), and a set builder 208.

The harvester 202 indexes and processes documents including files, calendar events, to do lists, notes, emails, and email attachments. These documents may be retrieved locally from the user's computer and/or remotely from network storage. In the latter case, the harvester 202 may also retrieve documents from the World Wide Web (e.g., web pages). The harvester 202 is coupled to the FTQ processor 204 and the pipeline 206, such that the harvester 202 may provide harvested documents to the FTQ processor 204 and the pipeline 206.

The FTQ processor 204, as discussed above, is coupled to the harvester 202. In addition to the harvested documents, the FTQ processor also receives triggering items from the computing device. As discussed above, a triggering item may comprise an event or a document. The triggering item may be entered directly by the user or may be entered automatically by an application running on the computing device.

The FTQ processor 204 estimates the relevancy of the triggering item to the harvested documents. In one embodiment, the FTQ processor extracts features from the triggering item (such as keywords, people, dates, locations, acronyms, or the like) and then builds a query around these features. In one embodiment, the features are assigned weights in the query. The query is then run against a search (e.g., a LUCENE full text query) over the harvested documents. This produces a set of raw data that can be used to relate the harvested documents to the triggering item. In an alternative embodiment, the FTQ processor may also rank the harvested documents based upon the features (words) and document frequency. The FTQ processor 204 is coupled to the pipeline 206 and provides the raw data (or the ranked list) to the pipeline 206.

The pipeline 206 also receives the triggering item. The pipeline 206 uses information about the triggering item and the raw data (or the ranked list of documents) produced by the FTQ processor 204 to filter and rank (or re-rank) the documents. As discussed above, the pipeline 206 comprises a plurality of pipelined processors 210 (i.e., the output of one processor 210 passes as input to the next processor in the series). In one embodiment, each of the processors 210 contains its own persistent state (model, classifier, etc.). The processors 210 are arranged such that the first processor $210_1$ establishes an initial set of scores or rankings for the documents, and the subsequent processors $210_2$-$210_n$ adjust these scores. Each of the processors 210 may adjust the scores based on a different algorithm or model. For example, the processors 210 adjust the scores based on text frequency/inverse document frequency, proximity, or object recency, among other criteria. The pipeline 206 is coupled to the set builder 208 and provides the list of filtered and re-ranked documents to the set builder.

The set builder 208 is coupled to the pipeline 206 and receives the list of filtered and ranked documents from the pipeline 206. The set builder 208 outputs a final set of documents relevant to the triggering item.

In one embodiment, the system 200 additionally comprises a feedback bus 212 that receives user feedback regarding the final set of documents. The feedback bus is coupled to at least one of the processors 210 in the pipeline 206 and to the set builder 208. In this way, the set builder 208 or any coupled processor 210 may access the user feedback that is available via the feedback bus 212. The user feedback may be used to refine the assembly of future sets of documents. For example, the user feedback may be provided to any one or more of the processors 210 (e.g., automatically or responsive to a request from one or more of the processors 210). Where the processors 210 are capable of maintaining their own persistent states, the user feedback can be used to help train or adjust the algorithms or models used by the processors 210.

Those skilled in the art will appreciate that FIG. 2 illustrates only one possible configuration of the system 200. In alternative configurations, for example, two or more of the individual system components could be replaced by a single component. Conversely, any single one of the system components could be replaced by multiple components.

Figure 3:
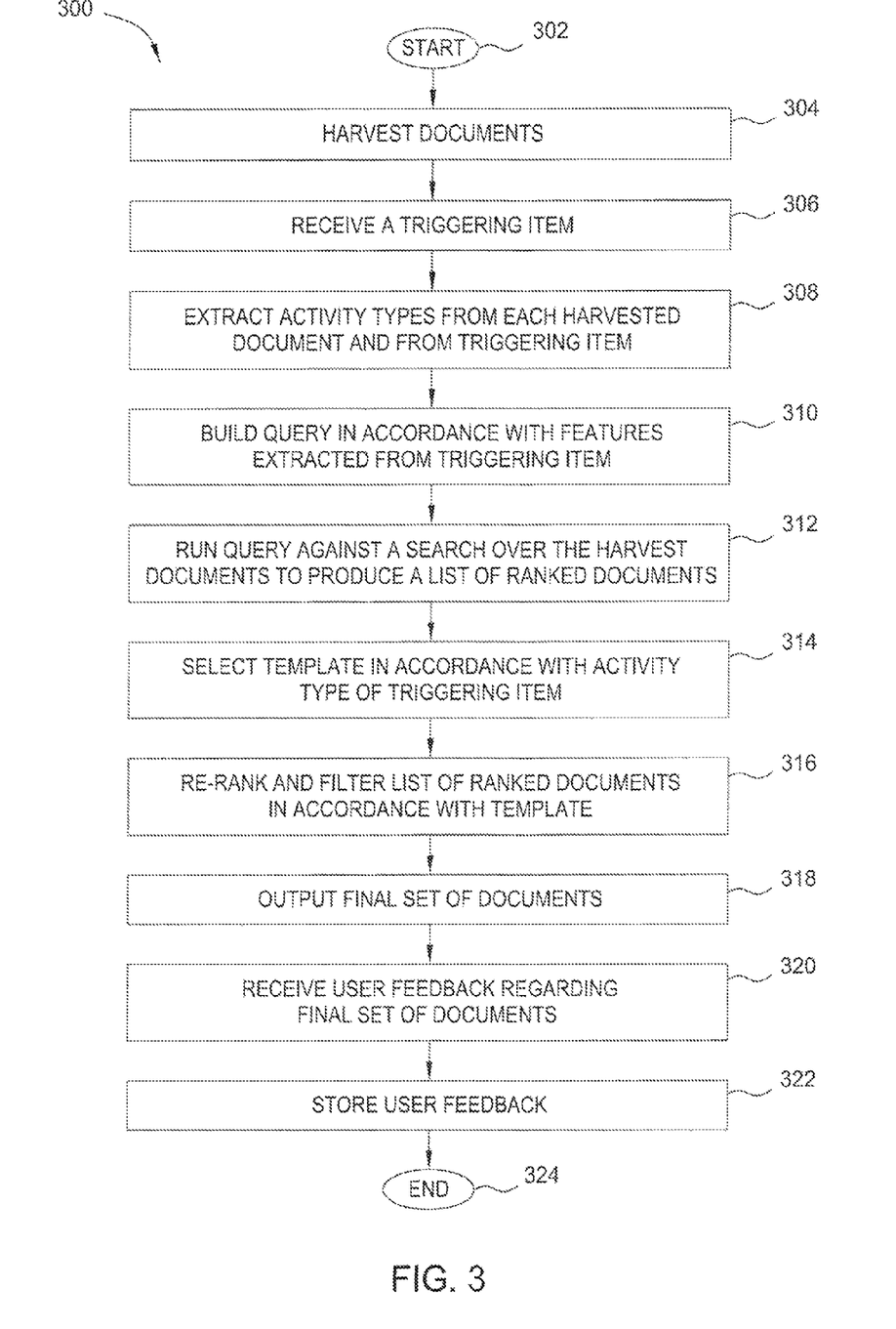
FIG. 3 is a flow diagram illustrating one embodiment of a method for assembling a set of documents related to a triggering item, according to the present invention.

FIG. 3 is a flow diagram illustrating one embodiment of a method 300 for assembling a set of documents related to a triggering item, according to the present invention. The method 300 may be implemented, for example, by the systems 100 and 200 illustrated in FIGS. 1 and 2. As such, reference is made in the discussion of FIG. 3 to various elements of FIGS. 1 and 2. It will be appreciated, however, that the method 300 is not limited to execution within a system configured exactly as illustrated in FIG. 1 or FIG. 2 and, may, in fact, execute within systems having alternative configurations.

The method 300 is initialized at step 302 and proceeds to step 304, where the harvester 102 (or 202) harvests documents including files (e.g., word processing files, spreadsheet files, presentation files, individual slides in presentation files, etc.), calendar events, to do lists, notes, emails, and email attachments. These documents may be retrieved locally from the user's computer and/or remotely from network storage. In the latter case, the harvested documents may also include documents retrieved from the World Wide Web (e.g., web pages).

In step 306, the FTQ processor 104 and the classifier 106 (or FTQ processor 204 and pipeline 206) receive a triggering item (e.g., a document or event). In one embodiment, the system 100 (or 200) proactively detects the triggering item and assembles the documents (i.e., without receiving a request from the user to assemble the documents). For example, the system 100 (or 200) may detect the addition of a new item to the user's calendar and automatically assemble a set of relevant documents. In yet another embodiment, the triggering event comprises the user accessing an application that assembles the set of documents.

In step 308, the classifier 106 extracts an activity type from the triggering item and from each of the harvested documents. It should be noted that the activity type may be extracted from the harvested documents in advance of the receipt of the triggering item (i.e., the activity type is not necessarily extracted from the harvested documents simultaneously with the extraction of the activity type from the triggering item). For instance, in one embodiment, harvesting and classification of documents is performed substantially continuously (e.g., on a long-term basis), even when there are no triggering items on which to operate. In one embodiment, the activity type is determined by first parsing the text of the triggering item or the document into separate words (removing punctuation and stop words). An information or semantic extraction algorithm may be used to find word types. The classifier 106 then determines the activity type by classifying the triggering item or the document in accordance with the parsed words. In one embodiment, the classification is performed in accordance with a maximum entropy classifier. In another embodiment (e.g., where the method 300 executes within the system 200 illustrated in FIG. 2, one or more of the processors 210 may extract the activity type).

In step 310, the FTQ processor 104 (or 204) builds a query in accordance with features extracted from the triggering item. The features may be, but are not necessarily, the same as the words that are parsed for classification purposes. In one embodiment, the extracted features include at least one of: a keyword, a person, a date, a location, or an acronym. Stop words are discarded. In one embodiment, the query is built by assigning weights to the extracted features. In one embodiment, the query is a Lucene full text query.

In step 312, the FTQ processor 104 (or 204) runs the query against a search over the harvested documents. This produces a list of ranked documents based upon the extracted features (words) and document frequency.

In step 314, the classifier 106 selects a template in accordance with the activity type of the triggering item. The set of templates 110 includes a plurality of templates associated with different activity types. A given template identifies, for the associated activity type, the kinds of documents that a user would typically wish to gather. For example, a template for the activity type "business trip" might list the following types of documents: flight information, hotel reservation, car reservation, weather forecast, contact information, and the like. In one embodiment, the system 100 is pre-trained with knowledge of certain activity types and their associated templates; however, the system 100 can also be trained to learn new activity types and their associated templates. In one embodiment, the classifier 106 selects the appropriate template by using the triggering item's activity type as a key into a template hash table.

In step 316, the set builder 108 re-ranks and filters the list of ranked documents produced by the FTQ processor 104, in accordance with the template selected by the classifier 106 and the activity types of the documents in the list of ranked documents. In one embodiment, the set builder 108 does this by comparing the activity type of each document to the activity type of the selected template. The ranks of the documents whose activity types match the activity type of the template are increased, while the ranks of the documents whose activity types do not match the activity type of the template are reduced (or the documents are removed from the list). In the case of the system 200, the re-ranking and filtering is performed by the pipeline 206, in accordance with the algorithms or models implemented in each of the processors 210. In this instance, it is possible that no templates may be used.

In one embodiment, ranking the documents includes recency ranking, word popularity, and learning. An initial ranking may be based on a combination of recency ranking and word popularity. Recency ranking assigns a higher weight to documents having later modification dates, access dates, and/or number of accesses. Word popularity uses a global dictionary containing high frequency words and weights. The number of high frequency words is user-configurable and may be set to a finite number of words (e.g., fifty thousand). When a new document is harvested, keywords that do not exist in the dictionary are added to the dictionary.

In a further embodiment, stemming is applied to obtain root words, and all words are converted to the lowercase letters. Weights in the dictionary may be updated continuously as the system 100 (or 200) operates. Keywords appearing in frequently accesses documents may be assigned higher weights, while keywords appearing in less frequently accessed documents may be assigned lower weights. In this way, the system 100 (or 200) has access to an up-to-date and accurate model of the user's universe and behavior.

The re-ranking and filtering performed in step 316 produces a final set of documents. The final set of documents comprises at least one document that the system 100 (or 200) believes is relevant to the triggering item. In one embodiment, the final set of documents may also include an alert to notify the user of potentially missing information (e.g., no hotel reservation was located for a business trip). Alternatively, the system 100 (or 200) could interface with a task learning application that determines the appropriate procedure to execute to retrieve the missing document. The final set of documents is output by the set builder 108 (or 208) in step 318.

In step 320, the set builder 108 optionally receives user feedback regarding the final set of documents. The user feedback may be implicit or explicit. Explicit feedback might include, for example, a user command to keep a given document in the final set of documents or to remove a given document from the final set of documents. Implicit feedback might include, for example, the fact the a user did or did not open a given document in the final set of documents, that the user opened a folder containing a given document in the final set of documents, or asked for items that are similar to a given document in the final set of documents.

In step 322, the set builder 108 (or 208) stores the user feedback. Storage of the user feedback involves adjusting the way in which the set builder 108 builds sets of documents. In one embodiment, the set builder 108 (or 208) updates the global dictionary (discussed above) at the word level. For example, the weights of the most significant words in the document corresponding to the user feedback may be increased if the user feedback is positive, or decreased if the user feedback is negative. Additionally, keywords from the query built in step 310 may be added to the document as metadata. If the keywords also exist in the global dictionary, their weights may also be adjusted as described above. The global dictionary may then be used to re-rank sets of documents assembled in response to future queries. The metadata stored with the documents may also be used to increase the rank of the documents (e.g., when the metadata matches future query keywords, the documents' ranks are increased).

In another embodiment, the set builder 108 (or 208) makes updates at the document level. For example, each document in the final set of documents may be associated with a signature of the triggering item, where the signature also indicates whether the user feedback with respect to the document was positive or negative. If the document then shows up in a future list of ranked documents, the set builder 108 (or 208) will compare the signature to the signature of the current triggering item. If the signatures match and the user feedback was positive, the document's ranking is increased; if the signatures match and the user feedback was negative, the document's ranking is decreased. In one embodiment, explicit feedback has a more significant effect on ranking than implicit feedback.

In the case of the system 200, the set builder 208 may provide the user feedback to one or more of the processors 210. As discussed above, any of the processors 210 may adjust the algorithms or models implemented therein in accordance with the user feedback.

The method 300 terminates in step 324.

As discussed above, the system 100 may be pre-trained with knowledge of certain activity types and their associated templates. However, the system 100 can also be trained by the user to learn other activity types and their associated templates. To do this, the user identifies a new document and its associated activity type. This information is fed to the classifier 106, which subsequently parses the new document for words and word types (e.g., dates, times, names, etc.). An information or semantic extraction algorithm may be used. The activity type, words, and word types are then stored by the classifier 106 as a new class.

In a similar manner, the system 100 can also be trained to recognize new documents of a known activity type. A new document is parsed into words and word types as described above. These words and word types are used, along with the known activity type, as training data for the classifier 106.

As discussed above, the systems 100 and 200 and associated method 300 may be deployed in substantially any computing device or network. Although the examples discussed above relate mostly to desk top applications, other applications are envisioned. For example, the system 100 or 200 may be deployed in a home or office network. In such a case, the system 100 or 200 can interact with other "smart" devices. For instance, a "smart" refrigerator that is connected to a home network may be able to detect what grocery items are in short supply, or a printer may be able to detect when it is about to run out of ink. In this case, the user may query the system 100 or 200 for a shopping list (e.g., where the triggering item is the event "grocery shopping"). The system 100 or 200 may further search for coupons for the items on the shopping list or for prices. Thus, the final set of documents presented to the user might include a shopping list, a set of coupons, and a list of stores advertising the lowest prices for the items on the shopping list.

In further embodiments still, the system 100 or 200 may be configured to continuously update the user with information that is relevant to his interests. For example, the triggering item may be the user's musical interests, the user's children's extracurricular activities, the user's upcoming vacation, the user's favorite sports teams, the user's current location, or the like. In this case, the user does not have to search for this information; rather, the information is automatically delivered by the system 100 or 200, which proactively assembles a set of personalized documents relating to current information that is of interest to the user.

Sorting and/or ranking of this information may be based on the time of day and/or the user's interest level (e.g., as expressed in a user profile). For instance, if the current time of day falls within the user's normal working hours, work-related information (e.g., "John just scheduled a meeting for 2:00 P.M. tomorrow") might be ranked more highly than information that is not work related (e.g., "Tickets go on sale for the Giants game in ten minutes"). The type of information provided, as well as the manner and time in which the information is provided, may by learned dynamically based on user feedback or based on a user profile.

In one embodiment, the set of personalized documents is assembled on a periodic basis (e.g., every thirty minutes). In another embodiment, the set of personalized documents is assembled as new relevant information is detected. Time sensitive documents may be removed from the set as they become outdated, so that the storage required by the system 100 or 200 is relatively low. In one embodiment, this service is activated only when the user accesses the system 100 or 200. Thus, the user's activity need not be constantly monitored. Rather, the set of personalized documents could be stored (e.g., on a web site) for viewing at a time of the user's choosing. In another embodiment, the set of personalized documents is provided as part of a notification service that notifies the user when new documents are available.

The set of personalized documents may also include hyperlinks or other executable code that allows the user to share one or more documents in an email or on a social networking site (e.g., email a family member to let them know that a flight has been delayed), to add an event to the user's calendar (e.g., add an entry for a child's upcoming soccer game), to initiate a commercial transaction (e.g., purchase tickets to an upcoming concert), or to simply obtain more information about a given document (e.g., read the full news article about a particular event).

Thus, the set of personalized documents might resemble the following:

It is 11:45 A.M., cloudy, and 76 degrees Fahrenheit
Your son scheduled a soccer game on Saturday at 2:00 P.M.
Your flight to Denver has been delayed by 50 minutes
Brad Paisley is playing a concert nearby next week (Buy tickets?)
The Giants won (Email your friends?)
You have two new email messages from your boss In another embodiment, this information may be grouped and/or ranked. In this case, the above set of personalized documents might resemble the following:

General

It is 11:45 A.M., cloudy, and 76 degrees Fahrenheit

Business

Your flight to Denver has been delayed by 50 minutes
You have two new email messages from your boss Family Your son scheduled a soccer game on Saturday at 2:00 P.M.

Entertainment

Brad Paisley is playing a concert nearby next week (Buy tickets?)
The Giants won (Email your friends?)

Figure 4:
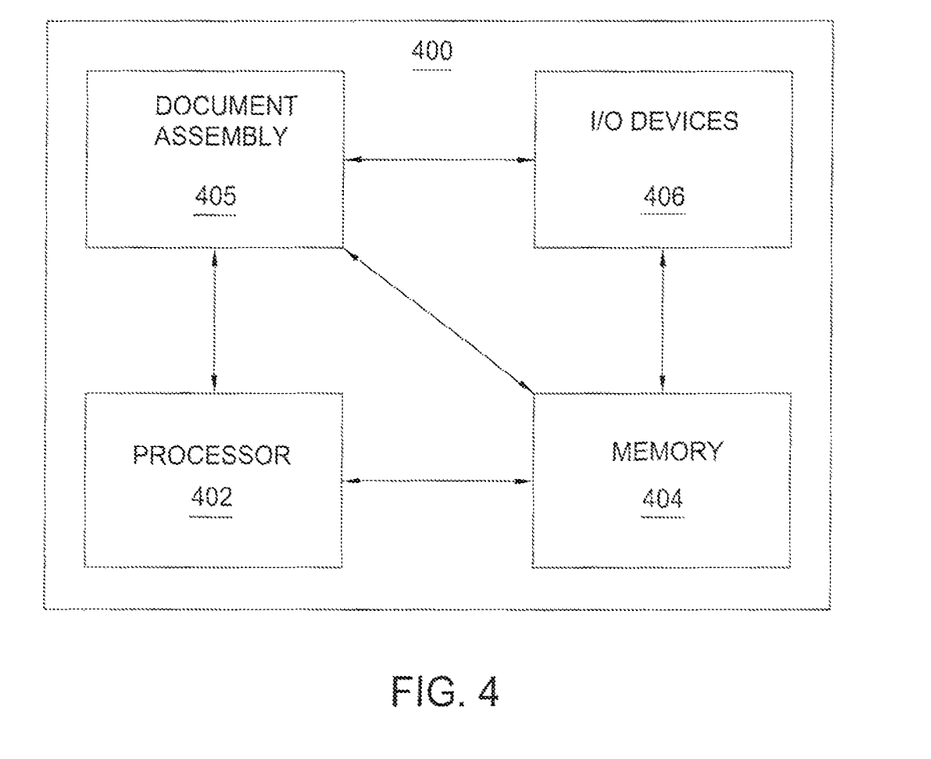
FIG. 4 is a high level block diagram of the present invention implemented using a general purpose computing device.

FIG. 4 is a high level block diagram of the present invention implemented using a general purpose computing device 400. It should be understood that embodiments of the invention can be implemented as a physical device or subsystem that is coupled to a processor through a communication channel. Therefore, in one embodiment, a general purpose computing device 400 comprises a processor 402, a memory 404, a document assembly module 405, and various input/output (I/O) devices 406 such as a display, a keyboard, a mouse, a modem, a microphone, speakers, a touch screen, and the like. In one embodiment, at least one I/O device is a storage device (e.g., a disk drive, an optical disk drive, a flash drive).

Alternatively, embodiments of the present invention (e.g., document assembly module 405) can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the document assembly module 405 for assembling a set of documents related to a triggering item described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A computer-implemented method for assembling a set of electronic documents related to an electronic triggering item, the method comprising:
    using a machine-learning based classifier, classifying electronic documents in a set of harvested documents as being associated with at least one activity type, the at least one activity type describing an event involving human activity in the physical world;
    when the triggering item is received, identifying an activity type based on the triggering item;
    using the machine learning-based classifier, selecting a template that corresponds to the activity type that is based on the triggering item, wherein the selected template is selected from a set of templates that are associated with different activity types and the templates in the set of templates include lists of different types of documents that are associated with the different activity types;
    using the selected template, ranking the documents in the set of harvested documents based on how closely the documents in the set of harvested documents match the activity type that is based on the triggering item, wherein the ranking comprises increasing the ranking of a document when an activity type of the document matches the activity type associated with the template and decreasing the ranking of a document when an activity type of the document does not match the activity type associated with the template;
    using the ranking, outputting the set of electronic documents relevant to the triggering item.

2. The method of claim 1, wherein the triggering item comprises an electronic reference to at least one user activity, and the set of features relates to the at least one user activity.

3. The method of claim 2, wherein the triggering item comprises an electronic mail message.

4. The method of claim 2, wherein the triggering item comprises an electronic file.

5. The method of claim 2, wherein the triggering item comprises an entry in a calendar application.

6. The method of claim 2, wherein the at least one user activity comprises a trip.

7. The method of claim 2, wherein the at least one user activity comprises a meeting.

8. The method of claim 7, wherein the meeting comprises an employment interview.

9. The method of claim 2, wherein the at least one user activity comprises a proposal activity.

10. The method of claim 2, wherein the at least one user activity comprises a review of a technical paper.

11. The method of claim 1, comprising extracting a set of features from the triggering item, wherein the set of features comprises at least one of: a keyword, a person, a date, a location, or an acronym.

12. The method of claim 1, comprising extracting a set of features from the triggering item, wherein the set of features defines an activity type associated with the triggering item.

13. The method of claim 1, comprising:
extracting a set of features from the triggering item
building a query in accordance with the set of features;
running a search using the query over a plurality of available documents from the plurality of different types of electronic sources.

14. The method of claim 13, wherein the query comprises a weight associated with at least one feature in the set of features.

15. The method of claim 13, wherein the running produces a list of documents ranked according to relevance to the set of features and document frequency.

16. The method of claim 13, further comprising:
automatically harvesting the plurality of available documents using a classifier.

17. The method of claim 1, wherein the plurality of documents is retrieved from a plurality of different types of electronic sources.

18. The method of claim 17, wherein the plurality of different types of electronic sources includes a local storage device of the computing device.

19. The method of claim 1, further comprising: re-ranking the set of documents.

20. The method of claim 1, further comprising: outputting the plurality of documents to an input/output device.

21. The method of claim 20, further comprising:
receiving feedback relating to at least one document in the set of harvested documents.

22. The method of claim 21, further comprising:
adjusting the ranking in accordance with the feedback.

23. The method of claim 22, wherein the adjusting comprises updating a global dictionary used to guide the ranking.

24. The method of claim 22, wherein the adjusting comprises associating the set of harvested documents with a signature of the triggering item.

25. The method of claim 22, wherein the adjusting comprises adjusting an algorithm or model used to assign a score to the set of harvested documents.

26. The method of claim 1, wherein the plurality of documents includes at least one personal document.

27. The method of claim 1, wherein the triggering item is a single item detected by the computing device.

28. The method of claim 1, comprising, when information relevant to the triggering item is not included in the set of electronic documents, generating an alert and outputting the alert with the outputting of the set of electronic documents.

29. A non-transitory computer readable medium containing an executable program for assembling a set of electronic documents related to an electronic triggering item, where the program performs steps comprising:
using a machine-learning based classifier, classifying electronic documents in a set of harvested documents as being associated with at least one activity type, the at least one activity type describing an event involving human activity in the physical world;
when the triggering item is received, identifying an activity type based on the triggering item;
using the machine learning-based classifier, selecting a template that corresponds to the activity type that is based on the triggering item, wherein the selected template is selected from a set of templates that are associated with different activity types and the templates in the set of templates include lists of different types of documents that are associated with the different activity types;
using the selected template, ranking the documents in the set of harvested documents based on how closely the documents in the set of harvested documents match the activity type that is based on the triggering item, wherein the ranking comprises increasing the ranking of a document when an activity type of the document matches the activity type associated with the template and decreasing the ranking of a document when an activity type of the document does not match the activity type associated with the template;
using the ranking, outputting the set of electronic documents relevant to the triggering item.

30. A system for assembling a set of electronic documents related to an electronic triggering item, the system comprising at least one processor for:
classifying electronic documents in a set of harvested documents as being associated with at least one activity type, the at least one activity type describing an event involving human activity in the physical world;
when the triggering item is received, identifying an activity type based on the triggering item;
using the machine learning-based classifier, selecting a template that corresponds to the activity type that is based on the triggering item, wherein the selected template is selected from a set of templates that are associated with different activity types and the templates in the set of templates include lists of different types of documents that are associated with the different activity types;
using the selected template, ranking the documents in the set of harvested documents based on how closely the documents in the set of harvested documents match the activity type that is based on the triggering item, wherein the ranking comprises increasing the ranking of a document when an activity type of the document matches the activity type associated with the template and decreasing the ranking of a document when an activity type of the document does not match the activity type associated with the template;
using the ranking, outputting the set of electronic documents relevant to the triggering item.

* * * * *